United States Patent [19]

Moreland, Jr.

[11] 3,993,143
[45] Nov. 23, 1976

[54] TURF RECONDITIONING APPARATUS AND METHOD

[76] Inventor: John W. Moreland, Jr., 6420 Highway 51, Charlotte, N.C. 28211

[22] Filed: Oct. 22, 1974

[21] Appl. No.: 517,012

[52] U.S. Cl. .............................. 172/22; 76/101 R; 172/60
[51] Int. Cl.² ........................................ A01B 45/02
[58] Field of Search .............. 172/120, 21, 123, 22, 172/60

[56] References Cited
UNITED STATES PATENTS

| | | | |
|---|---|---|---|
| 1,702,707 | 2/1929 | Sleffel | 172/120 |
| 2,726,590 | 12/1955 | Campbell | 172/21 |
| 3,120,279 | 2/1964 | Horowitz | 172/123 X |
| 3,734,197 | 5/1973 | Zehrung | 172/21 |
| 3,739,856 | 6/1973 | Ray | 172/21 |

Primary Examiner—George J. Marlo
Attorney, Agent, or Firm—Bell, Seltzer, Park & Gibson

[57] ABSTRACT

A turf reconditioning apparatus adapted to aerate and relieve the compaction of the soil, and comprising a plurality of cutting discs disposed along a supporting drive shaft, and with each cutting disc comprising a plurality of curved blades defining a sharp point at the remote free end thereof. The speed of rotation of the discs is coordinated to the forward movement of the apparatus whereby the point of each blade enters the ground substantially vertically to thereby reduce the power consumption and minimize wear along the side edges of the blade. The curved nature of the blade further serves to lift some of the loosened soil from the slits formed in the ground to thereby provide a light top dressing of the removed soil. The curved blades may be efficiently cut from a rectangular plate by a process wherein no additional machining or finishing operations is required.

8 Claims, 7 Drawing Figures

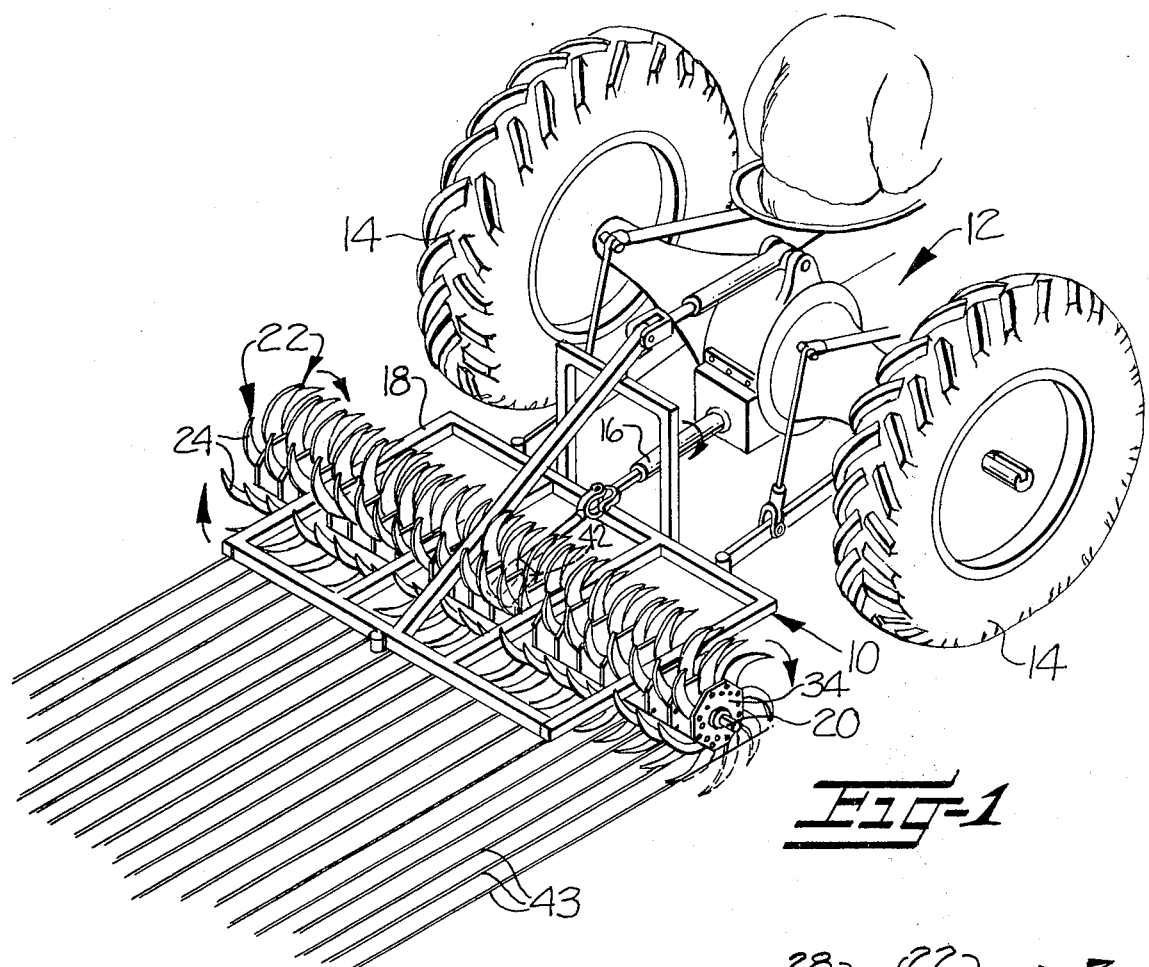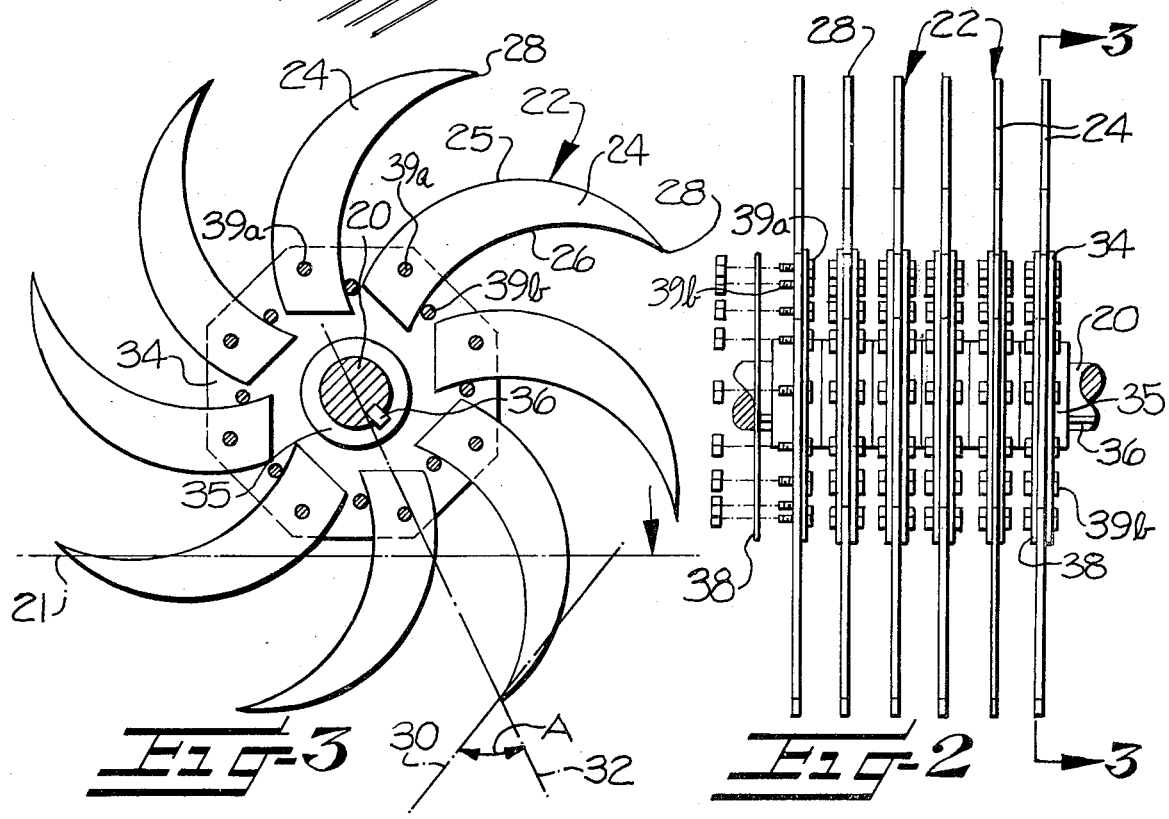

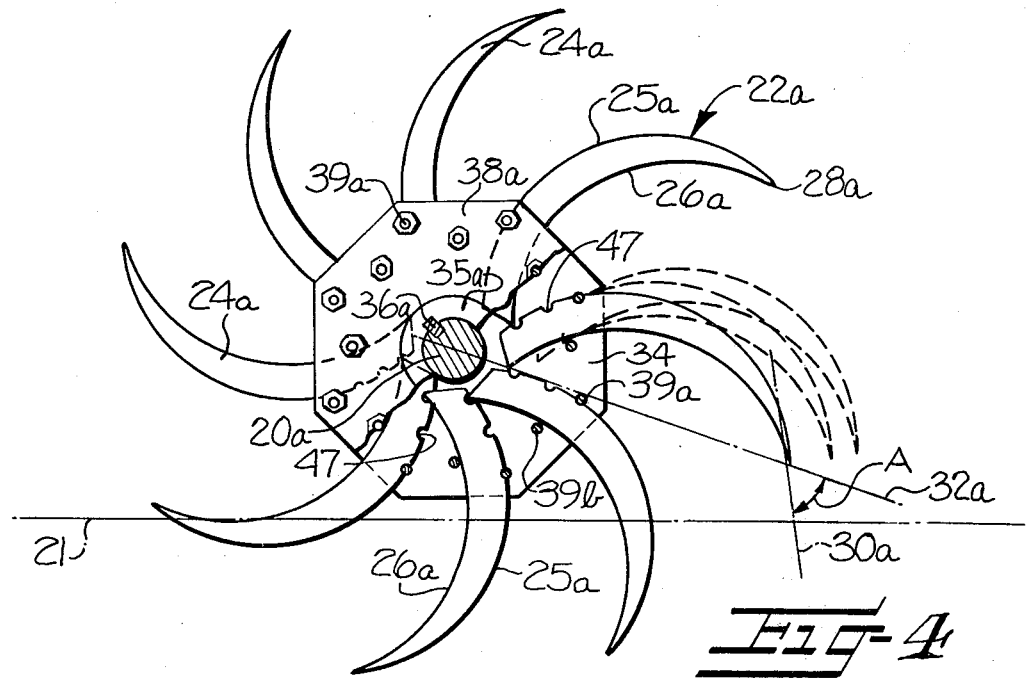
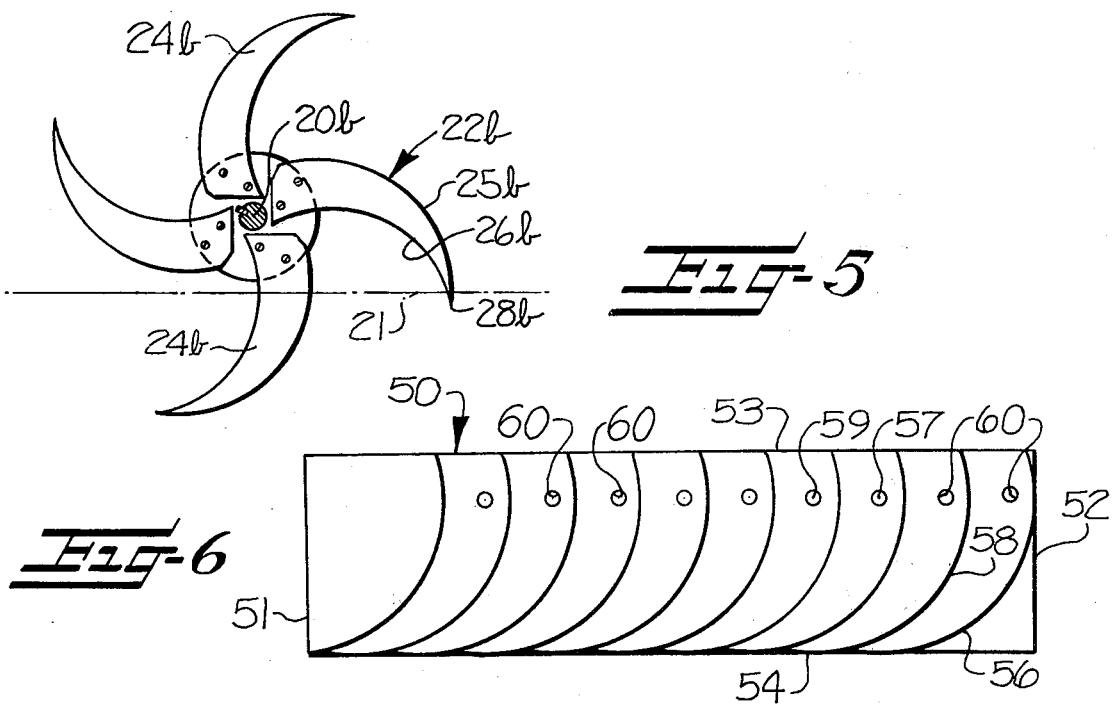

TURF RECONDITIONING APPARATUS AND METHOD

The present invention relates to a turf reconditioning apparatus of the type commonly employed in aerating and reconditioning lawns, playing fields, greens and fairways of golf courses, and the like. More particularly, the apparatus of the present invention is adapted simultaneously and efficiently perform several turf maintenance functions, including aeration, compaction relief, top dressing, and verti-cutting.

In the maintenance of lawns of the described type, it is common to employ an apparatus which comprises a plurality of vertically reciprocating hollow punches which successively enter the ground and remove cores of soil therefrom, the cores traveling upwardly through the hollow punches to be deposited on the surface of the ground. While such machines are widely used, they are not entirely satisfactory since the depth to which the punches are able to penetrate the ground is normally limited to between about 2 to 3 inches. Further, the energy necessary to operate the punches is significant, and the forces generated by the punching operation cause frequent breakdowns of the equipment. Finally, the presence of the cores makes the surface of the ground unsuitable for many uses, such as playing golf, and thus the ground must be raked or otherwise cleaned after being reconditioned.

It has also been proposed to employ disc type machines having rotary knives for aerating the soil. The knives of such machines slice into the ground and form a continuous slit therein without removing or lifting any significant amount of soil from the ground. This operation temporarily opens the soil, but the overall compaction is not relieved since the soil is merely forced laterally by the knives, and it quickly returns to its initial position. Also, these machines have a large power requirement since the slicing of the blades into the soil requires a great deal of energy, and the blades are quickly dulled and worn by this sliding movement through the soil, thus requiring the replacement of the blades at frequent intervals.

It is accordingly an object of the present invention to provide a turf reconditioning apparatus and method which is adapted to simultaneously perform several turf maintenance functions, and which does not suffer from the above disadvantages of the presently employed machines.

It is also an object of the present invention to provide a turf reconditioning apparatus which does not significantly disrupt the surface of the soil, so that the ground is in condition to be used immediately after the reconditioning operation.

It is a more particular object of the present invention to provide a turf reconditioning apparatus having a plurality of curved blades, with each blade having a pointed end which is adapted to enter the ground substantially vertically to minimize the power requirement, and then move rearwardly such that the concave side of the blade lifts the loosened or broken soil from the slit to provide a light top dressing on the surface of the soil.

It is also an object of the present invention to provide a turf reconditioning apparatus of the described type wherein the configuration of the curved blades and their movement through the soil is adapted to self-sharpen the blades, while minimizing wear along the side edges thereof.

It is another object of the present invention to provide a turf reconditioning apparatus of the described type wherein the curved blades are adapted to penetrate into the soil to a depth of 4 inches or more, and wherein the blades may be selectively oriented to change the depth of penetration.

It is still another object of the present invention to provide a method of fabricating curved blades of the described type and wherein a number of blades may be cut from a common metal plate with a minimum of waste.

These and other objects and advantages of the present invention are achieved in the embodiments illustrated herein by the provision of a turf reconditoning apparatus which comprises a wheeled carriage which includes a horizontally disposed drive shaft, and a plurality of substantially flat, relatively thin blades fixedly carried on the shaft and extending radially outwardly therefrom. Each of the blades lies perpendicular to the horizontal shaft and includes arcuately curved side edges which converge to form a sharp point at the remote free end thereof. A prime mover is provided for translating the carriage over the ground and for rotating the drive shaft at a predetermined speed and direction with respect to the speed and direction of the transverse of the carriage, such that the points of the blades initially enter the ground in a substantially vertical direction.

In the drawings and specification, there has been set forth a preferred embodiment of the invention, and although specific terms are employed, they are used in a generic and descriptive sense only and not for purposes of limitation.

FIG. 1 is a fragmentary perspective view illustrating a turf reconditioning apparatus which embodies the present invention;

FIG. 2 is a fragmentary front elevation view of the drive shaft and several cutting discs of the apparatus illustrated in FIG. 1;

FIG. 3 is a sectioned side elevation view taken substantially along the line 3—3 of FIG. 2 and illustrating one cutting disc;

FIG. 4 is a view similar to FIG. 3, but illustrating another embodiment of the blades utilized in the present invention, and further illustrating the arrangement by which the blades may be attached to the plate in a selected one of a plurality of orientations;

FIG. 5 is a view similar to FIG. 3, but illustrating still another embodiment of the blades utilized in the present invention;

FIG. 6 is a top plan view of a metal plate and illustrating a method of fabricating the blades according to the present invention; and FIG. 7 is a schematic illustration of the path of a single blade during operation of the apparatus, and particularly illustrating the manner in which the blade penetrates the ground.

Referring more specifically to the drawings, FIG. 1 illustrates a carriage 10 embodying the present invention and which is adapted to transverse the surface of the ground. In the illustrated embodiment, the carriage comprises a conventional tractor 12 having drive wheels 14 and a power take-off 16, and a suitable rectangular frame 18 adapted to be operatively attached to the tractor. The frame in turn rotatably supports a horizontally disposed drive shaft 20 immediately above the surface of the ground which is indicated by the line 21 in the drawings.

A plurality of cutting discs 22 are fixedly carried on the shaft 20 and positioned along substantially the entire length thereof in an axially spaced apart relationship. Each of the cutting discs comprises a plurality of angularly spaced apart, subsantially flat, relatively thin, blades 24 extending radially outwardly from the shaft to define a plane lying substantially perpendicular to the horizontal axis defined by the shaft. As best seen in FIG. 3, each of the blades 24 includes arcuately curved opposite side edges 25, 26 which converge to form a sharp point 28 at the remote free end thereof, the side edges of each blade being curved along a commonly sized arc of a circle to define an outer convex side edge 25 and an inner concave side edge 26. The point 28 of each blade defines a direction (indicated by the line 30 in FIG. 3) which lies at an angle A with respect to a radial line 32 extending from the horizontal axis of the shaft 20 through such point, and all of the points are disposed in a common rotational direction (clockwise in FIG. 3) which, as will become apparent, corresponds to the forward traverse of the carriage across the surface of the ground. As will also become apparent, the points 28 are positioned a sufficient radial distance from the axis of the shaft 20 so as to enter the ground to a predetermined depth upon rotation of the shaft.

In the embodiment of FIGS. 1–3, the blades of each disc are mounted to the shaft by an arrangement which includes a generally circular supporting plate 34 having a central hub 35 receiving the drive shaft therethrough, the plate 34 being locked to the shaft by the key 36. A cooperating removable plate 38 overlies each of the supporting plates 34, the plates 34 and 38 being secured together in face to face relationship by a plurality of bolts 39a and 39b in the manner best seen in FIGS. 2 and 3. The blades 24 are disposed intermediate the plates 34 and 38 so as to be locked therebetween, and each blade further includes an aperture (not numbered) through the rear portion thereof for receiving one of the bolts 39a. A second bolt 39b is positioned to contact the concave edge 26 of each blade to prevent relative movement between the blade and supporting plates during the operation of the machine. As will be apparent, this mounting arrangement permits the individual blades 24 to be readily replaced upon becoming excessively worn or in the event of breakage, by simply loosening the adjacent bolts, removing the single bolt 39a which extends through the worn or broken blade, and then removing and replacing the blade.

The turf reconditioning apparatus of the present invention further includes power means for traversing the carriage 10 over the surface of the ground and for rotating the drive shaft 20 about its axis. In the illustrated embodiment, the power means takes the form of the engine and conventional power train (not shown) of the tractor 12 for driving the wheels 14, the power take-off 16, and a gear box 42 carried by the frame 18 which operatively interconnects the power take-off 16 and drive shaft 20.

In accordance with the present invention, the above described power means is designed to incorporate suitable gear ratios and the like such that the drive shaft 20 is rotated at a predetermined speed and direction with respect to the speed and direction of the transverse of the carriage whereby the points 28 of the blades 24 enter the ground in a substantially vertical direction as illustrated schematically in FIG. 7. More particularly, each blade 24 initially enters the ground substantially vertically, and then it moves rearwardly and upwardly to lift a portion of the broken soil onto the surface of the ground and thereby provide a light top dressing. Typically, a sufficient number of blades are positioned on each cutting disc such that a plurality of parallel, substantially open continuous slits 43 (FIG. 1) are formed in the ground traversed by the carriage to relieve the compaction thereof. However, by reducing the number of blades in each cutting disc, it is possible to form a line of spaced apart or interrupted slits (not shown). This latter arrangement is desirable in those instances where the ground is loose and would tend to be lifted by the action of more numerous blades. Futher, the blades in the different cutting discs 22 may, if desired, be angularly off-set from each other to prevent a large number of blades from contacting the ground in unison, and thereby make the power requirement more uniform.

In order to achieve the above described movement of the blade through the soil, it has been found that the drive shaft 20 should be rotated at a speed of between about 1½ to 3 times its free rolling speed, i.e., the speed at which the drive shaft would rotate if the carriage were drawn over the surface of the ground and the discs allowed to freewheel. A slower rotational speed will result in the blade entering the ground in a somewhat forward direction, while a faster speed will result in the blade entering the ground in a somewhat rearward direction.

Suprisingly, the above described vertical entry of the blade into the ground has been found to minimize the power requirement of the tractor engine, and also to substantially reduce the wear along the side edges of the blades. These advantages are believed to result from the fact that the blades do not slice into the ground as in the prior machines, but rather the sharp point serves to initially break and loosen the soil as it enters. As will be apparent from FIG. 7, the concave edge 26 moves through only the broken soil and thus is subject to very little wear. The convex edge 25 does contact the forward wall of the slit and thus does receive wear to some extent. However, this wear has been found desirable in that it provides a self-sharpening effect at the point 28 of the blade.

The particular blade configuration and shape illustrated in FIGS. 1–3 is suitable for the soil reconditioning of most ground surfaces, such as a large lawn or golf fairway. In this regard, it has been found that the angle A should be at least about 45°, and preferably between about 50° to 60°, so that the line 30 defined by the point 28 is directed substantially vertically when it contacts the ground line 21. Also, the lateral or axial spacing of the discs 22 normally should be between about 4 to 7 inches, with the shorter spacing being desirable in the case of golf greens or the like and the larger spacing being desirable for use on large open lawns or fairways.

In view of the fact that the entry of the blade of the present invention is substantially vertical and requires minimum energy, the blade may be designed to penetrate a substantial distance below the ground line 21. Typically, such penetration is between 4 to 7 inches. As a further aspect of the blade design, the thickness thereof will determine the width of the slits 43, as well as the amount of soil lifted therefrom by the blades. Generally, the blade has a thickness of between about ⅛ to ¼ inch, with the more thin blade being desirable on a golf green where it is desired to lift only a small amount of broken soil and minimize disruption of the soil intermediate the slits.

FIG. 4 illustrates a particular embodiment of the present invention wherein the blades may be selectively oriented to change the depth of penetration into the ground. More particularly, each blade 24a includes three apertures or notches 47 spaced along the convex edge 25a of the blade and immediately adjacent the rear end portion thereof. The notches are adapted to receive the bolt 39a, with the adjacent bolt 39b serving as an abutment against the concave edge 26b to prevent counterclockwise rotation of the blades when the drive shaft 20a rotates clockwise. As will be apparent from the drawings, the blades 24a may be positioned in any one of three predetermined positions to vary the radial extent thereof and thus the depth of penetration, by merely loosening the bolts and positioning the blade in the desired position. This arrangement is useful in cases where the blade is subject to hard usage and thus relatively rapid wear. In such cases, the blade may be initially positioned at the innermost solid line position, and then adjusted radially outwardly to the dotted line positions as the blade becomes worn and thus shorter.

FIG. 5 shows another embodiment wherein the number of blades 24b is reduced. Also, the blades 24b include two apertures (not numbered) in the rear portion so as to positively receive both associated bolts. The reduced number of blades may be desirable under some conditions.

The blades of the present invention may be efficiently fabricated from a flat rectangular plate 50 as seen in FIG. 6, the plate preferably comprising a relatively hard metal such as steel. The plate 50 defines end edges 51, 52 which typically measure about 6 to 12 inches, and elongated side edges 53, 54 which may be as long as 8 feet. The plate is first cut by means of a conventional torch, die, nibbler or the like along the arc 56 of a circle which has a center positioned within the bounds of the plate at 57. The location of the center 57 and the length of the radius of this circle are coordinated such that the arc 56 lies substantially tangent to the sides 52 and 54, while crossing the opposite side edges 53 at a relatively large angle.

The plate 50 is next cut along a second arc 58 of a second circle having a center 59 positioned longitudinally below and aligned with the center 57 of the first circle. Also, the radius of the second circle corresponds to the length of that of the first circle, to thereby form a blade between the arcs 56 and 58 which generally requires no additional machining or finishing operations. This process is then repeated as many times as is required to utilize the entire plate 50 in the manner indicated in FIG. 6. As a final step, an aperture 60 is cut in each blade adjacent the rear end portion thereof for facilitating the attachment of the blade to the supporting plates in the manner described above. In the illustrated embodiment, the apertures 60 are formed at a location on each blade which corresponds to the center of the circle for a previously formed blade.

As will be apparent from the above description, the present invention is adapted to simultaneously and efficiently perform several turf maintenance functions, including aeration and compaction relief which improve water percolation and facilitate the water and nutrients in reaching the roots of the grass. Also, the apparatus may be utilized to deposit a light top dressing on the soil, and to sever the horizontally directed stolons and/or rhizomes of certain grasses to stimulate growth (commonly referred to as verti-cutting). Finally, the apparatus is able to accomplish these functions without significantly disrupting the surface of the soil, and without leaving large lumps or cores of soil on the surface.

While the illustrated apparatus discloses the use of a conventional tractor for drawing the apparatus over the ground surface and rotating the drive shaft 20, it will be understood that the invention may take the form of a conventional manually operated garden tiller having an engine for driving the wheels and rotating the drive shaft.

In the drawings and specification, there has been set forth a preferred embodiment of the invention, and although specific terms are employed, they are used in a generic and descriptive sense only and not for purposes of limitation.

That which is claimed is:

1. A turf reconditioning apparatus characterized by the ability to aerate and relieve the compaction of the soil while minimizing the power consumption thereof, said apparatus comprising a carriage having supporting wheels and adapted to traverse the ground to be reconditioned, a drive shaft rotatably carried by said carriage and defining a substantially horizontal axis positioned above the surface of the ground and extending parallel to the rotational axis of said supporting wheels, a plurality of cutting discs fixedly carried on said shaft and positioned along substantially the entire length of said shaft in an axially spaced apart relationship, each of said cutting discs comprising a plurality of angularly spaced apart, substantially flat, blades having a thickness between about ⅛ to ¼ inches and extending radially outwardly from said shaft to define a plane lying substantially perpendicular to said horizontal axis, each of said blades including side edges which converge to form a sharp point at the remote free end thereof, and with all of said points being disposed in a common rotational direction corresponding to the forward traverse of the carriage, and with said points being positioned a sufficient distance from said horizontal axis so as to enter the ground a distance between about 4 to 6 inches upon rotation of said shaft, and power means for traversing said carriage over the ground and for rotating said drive shaft about said horizontal axis at a predetermined speed of between about 1½ to 3 times the free rolling speed of said drive shaft, and in a predetermined direction with respect to the direction of the traverse of the carriage such that the points of the blades initially enter the ground and then move rearwardly and upwardly to lift a portion of the broken soil onto the surface of the ground and the cutting discs form a plurality of parallel substantially open slits in the ground traversed by the carriage.

2. The turf reconditioning apparatus as defined in claim 1 wherein each of said cutting discs comprises at least four of said cutting blades, and each of said cutting blades is fabricated from relatively hard steel.

3. The turf reconditioning apparatus as defined in claim 1 wherein said side edges of each blade are curved along a commonly sized arc of a circle to define an outer convex side edge and an inner concave side edge.

4. The turf reconditioning apparatus as defined in claim 1 wherein said blades on each of said cutting discs are spaced apart a substantially equal angular distance from each other, and wherein the number of blades on each cutting disc is sufficient to result in a substantially continuous slit being formed in the ground by each cutting disc.

5. The turf reconditioning apparatus as defined in claim 4 wherein said cutting discs are axially spaced apart a distance of between about 4 to 7 inches.

6. The turf reconditioning apparatus as defined in claim 5 wherein each of said cutting discs comprises a generally circular supporting plate including a central hub receiving said drive shaft therethrough, and means for releasably attaching each of said blades to said plate, said attaching means comprising at least one aperture extending transversely through one of said plate and blade, at least two apertures extending transversely through the other of said plate and blade, and a bolt adapted to extend through aligned apertures in said plate and blade, whereby said blade may be attached to said plate in a selected one of a plurality of orientations.

7. The turf reconditioning apparatus as defined in claim 1 wherein said side edges of each blade are arcuately curved to define an outer convex side edge and an inner concave side edge.

8. A method of reconditioning turf to aerate and relieve the compaction thereof and including the steps of traversing the ground with a carriage which mounts a rotatable drive shaft having a plurality of cutting discs fixedly carried thereon, and with each of the discs comprising a plurality of angularly spaced apart, substantially flat, blades having a thickness between about ⅛ to ¼ inches and lying in a common plane which is perpendicular to the axis of the drive shaft, and with each blade further having side edges which converge to form a forwardly directed sharp point at the remote free end thereof, while rotating said drive shaft in a direction corresponding to the forward traverse of the carriage and at a speed between about 1½ to 3 times the free rolling speed of the drive shaft, and while maintaining the drive shaft at an elevation immediately above the surface of the ground such that the points of the blades enter the ground to a depth of between about 4 to 6 inches and in a substantially vertical direction and then move rearwardly and upwardly to lift a portion of the broken soil onto the surface of the ground and thereby form a plurality of parallel substantially open slits in the ground traversed by the carriage and deposit a light top dressing on the surface of the ground.

* * * * *